United States Patent [19]
Chandrasekaran

[11] 3,893,987

[45] July 8, 1975

[54] MODIFIED HEXA FLUOROISOBUTYLENE/VINYLIDENE FLUORIDE COPOLYMERS HAVING IMPROVED PROCESSING CHARACTERISTICS

[75] Inventor: Swayambu Chandrasekaran, East Orange, N.J.

[73] Assignee: Allied Chemical Corporation, New York, N.Y.

[22] Filed: May 20, 1974

[21] Appl. No.: 471,512

[52] U.S. Cl.......... 260/80.77; 260/87.5 B; 260/87.7
[51] Int. Cl. ............................................ C08f 15/40
[58] Field of Search.................................. 260/80.77

[56] References Cited
UNITED STATES PATENTS
3,706,723  12/1972  Chandrasekaran et al. ........ 260/87.7

Primary Examiner—Stanford M. Levin
Attorney, Agent, or Firm—Gerhard H. Fuchs; Michael S. Jarosz

[57] ABSTRACT

This invention provides 3,3,3-trifluoro-2-trifluoromethyl propene/1,1-difluoroethylene copolymers additionally containing from about 0.1 to 30 mol percent of perhalogenated monomer selected from the group consisting of tetrafluoroethylene, chlorotrifluoroethylene and mixtures thereof, and method for making them. Addition of the perhalogenated monomer reduces melting point and crystallization temperature of the copolymer, thereby improving its melt processing characteristics, without seriously deteriorating its good mechanical properties and chemical resistance.

10 Claims, No Drawings

MODIFIED HEXA FLUOROISOBUTYLENE/VINYLIDENE FLUORIDE COPOLYMERS HAVING IMPROVED PROCESSING CHARACTERISTICS

BACKGROUND OF THE INVENTION

Copolymers of 3,3,3-trifluoro-2-trifluoromethyl propene and 1,1-difluoroethylene are disclosed in U.S. Pat. No. 3,706,723. Copolymers of 3,3,3-trifluoro-2-trifluoromethyl propene and 1,1-difluoroethylene having melting point of at least 200°C. containing from about 10 to about 52 mol percent of 3,3,3-trifluoro-2-trifluoromethyl propene and correspondingly from about 90 to 48 mol percent of 1,1-difluoroethylene have particularly advantageous properties, such as retention of mechanical strength at high temperatures and resistance to attack by corrosive agents and solvents. These copolymers are melt processable but may have melt temperatures as high as about 350°C. Lower melt temperatures would facilitate melt processing of the copolymer.

It is an object of the present invention to provide modified 3,3,3-trifluoro-2-trifluoromethyl propene/1,1-difluoroethylene copolymers having lower melt temperature than the corresponding unmodified copolymer.

SUMMARY OF THE PRESENT INVENTION

In accordance with the present invention it has been discovered that incorporation of halogenated monomers selected from the group consisting of tetrafluoroethylene, chlorotrifluoroethylene, and mixtures thereof in any proportion, in amount of 0.1 to 30 mol percent into copolymer of 3,3,3-trifluoro-2-trifluoromethyl propene (having the formula $(CF_3)_2C=CH_2$)) with 1,1-difluoroethylene have lower melting points than the corresponding copolymer not containing the halogenated comonomer, and have improved melt processing characteristics.

In accordance with the present invention there are provided copolymers of from about 5 to 52 mol percent of 3,3,3-trifluoro-2-trifluoromethyl propene, 30 to 90 mol percent of 1,1difluoroethylene and 0.1 to 30 mol percent of perhalogenated comonomer selected from the group consisting of tetrafluoroethylene, chlorotrifluoroethylene and mixtures thereof in any proportions.

The copolymer products of the present invention are obtained by copolymerizing the monomers in liquid medium in presence of a free radical generating polymerization initiator as hereinafter described.

DETAILED DESCRIPTION OF THE INVENTION

The 1,1-difluoroethylene, tetrafluoroethylene and chlorotrifluoroethylene monomers required for making copolymers of the present invention are commercially available.

The 3,3,3-trifluoro-2-trifluoromethyl propene monomer may be prepared as described by Kauffman et al., in *J. Org. Chem.* U.S. Pat. No. 31,3090 (1966). Briefly, its preparation involves refluxing hexafluoro-2-methyl-2-propanol with phosphorous pentachloride to obtain the desired 3,3,3-trifluoro-2-trifluoromethyl propene as non-condensed overhead product, together with concurrently formed hydrogen chloride. The hydrogen chloride can be removed from the crude overhead product by conventional techniques, such as by distillation or by scrubbing with alkaline media.

Copolymerization of the monomers is effected by contacting them in a suitable liquid polymerization medium in the presence of a free radical generating polymerization initiator.

Suitable liquid polymerization media include aqueous media as well as non-aqueous media, such as one or more of the liquid monomers, or non-polymerizable organic solvents, specifically those perfluorinated and perchlorofluorinated hydrocarbons containing up to about 10 carbon atoms which are liquid at the chosen polymerization temperature, and especially those perfluorinated and perchlorofluorinated alkanes of up to about 6 carbon atoms having melting points below about 80°C., and saturated perfluorocyclic ethers. A partial listing of organic solvents suitable for use as liquid polymerization media includes perfluorocyclobutane, pentachlorofluoroethane, trichlorotrifluoroethane, 1,1,2,2,-tetrachloro-1,2-difluoroethane, 1,1,1,2-tetrachlorodifluoroethane, octafluoropropane, perfluoro-n-butane, perfluoro-n-pentane, trichlorofluoromethane, dichlorofluoromethane, dichlorodifluoromethane, 1,2-dichloro-1,1,2,2-tetrafluoroethane, and the like, the 3,3,3-trifluoro-2-trifluoromethyl propene monomer and octafluorocyclobutane being most preferred.

Suitable free radical generating polymerization initiators include organic peroxy compounds such as the well known aliphatic and aromatic peroxy compounds, including the fluorine and chlorine substituted organic peroxides, as for example, 2,4-dichlorobenzoyl peroxide, t-butylperoxypivalate, pelargonyl peroxide, decanoyl peroxide, lauroyl peroxide, propionyl peroxide, acetyl peroxide, trifluoroacetyl peroxide, trichloroacetyl peroxide, perfluoropropionyl peroxide, succinic acid peroxide, t-butyl peroxyoctoate, benzoyl peroxide, p-chlorobenzoyl peroxide, t-butyl peroxyisobutyrate, t-butyl-peroxy maleic acid, 1-hydroxy-1'-hydroperoxy-dicyclohexyl peroxide, bis(1-hydroxycyclohexyl) peroxide, 2,5-dimethyl-hexane-2,5-diperbenzoate, t-butyl diperphthalate, t-butyl perbenzoate, n-butyl-4,4-bis(t-butylperoxy)valerate, ketone peroxide, 2,5-dimethyl-2,5-bis(t-butylperoxy)hexane, di-t-butyl peroxide, 2,5-dimethyl-2,5-bis(t-butyl peroxy)hexyne-3; organic azonitrile compounds such as azo-bis-isobutyronitrile, 2,2'-azo-bis-2,4-dimethylvaleronitrile, and 2,2'-azo-bis-2,3,3-trimethylbutyronitrile; peroxidic esters such as di-iso-propyl peroxydicarbonate, and others. Although the above-described free radical initiating polymerization initiators are especially suitable for making the copolymers of the present invention by copolymerizing the monomers using as liquid reaction medium one or more of the monomers per se, or using organic solvents as above described, they may also be used for carrying out the copolymerization in aqueous media in the presence or absence of emulsifying and/or suspending agents.

When the copolymerization is to be carried out in the presence of an aqueous medium, and, especially, in aqueous emulsion, there may additionally be used as free radical generating polymerization initiator water-soluble peroxides such as hydrogen peroxide, barium peroxide and sodium peroxide; persulfate, perphosphate and perborate salts of, e.g., sodium, potassium, calcium, barium and ammonium; and organic hydroperoxides such as cumene hydroperoxide or t-butyl hydroperoxide. These water-soluble free radical generating polymerization initiators may be used in conjunction with suitable reducing agents which act as catalyst activators, such as alkali metal bisulfites, alkali metal formaldehyde sulfoxylates, or sulfur dioxide. If desired, the above-described types of water soluble free radical generating polymerization initiators may be used in conjunction with known accelerators therefor, such as silver salts, for example, silver nitrate or silver nitrite, ferrous sulfate, ferrous nitrate, and others.

Generally, the initiator will be employed in amount of about 0.003 to about 3 percent, usually about 0.02 to about 1 percent by weight, based on the monomer charge. The initiator may be added initially, or, in order to maintain desired polymerization rates, intermittently or continuously throughout the polymerization.

Copolymerization may also be initiated or catalyzed by active radiation, as may, for example, be provided by ultraviolet light, $\gamma$-rays and the like.

When the copolymerization is carried out in an aqueous medium, then it is preferably carried out at temperatures at which the 3,3,3-trifluoro-2-trifluoromethyl propene, under prevailing pressures, will be present within the polymerization medium in liquid phase. Copolymerization of the monomers in aqueous media may be carried out in the presence or absence of well known buffering, suspending and emulsifying agents.

The copolymerization reaction in aqueous media is preferably conducted at a pH within the range of about 2 to 10, preferably within about 5 to 8, employing suitable buffers such as the carbonates, bicarbonates, phosphates, hydrogen phosphates, etc. of the alkali metals, for example, sodium carbonate, sodium bicarbonate, disodium hydrogen phosphate, and potassium pyrophosphate, or the borates of the alkali metals, such as sodium or potassium tetraborate.

Emulsifying agents suitable for use in carrying out the copolymerization in aqueous emulsion include the emulsifying agents customarily employed in emulsion polymerization of polymerizable ethylenically unsaturated organic compounds, such as alkali metal soaps of higher fatty acids, such as potassium, ammonium or sodium myristate, laurate, palmitate, oleate or stearate; the alkali metal or ammonium alkyl or alkylene sulfates or sulfonates, such as, e.g., sodium and/or potassium lauryl or decyl sulfate, cetyl and stearyl sulfonate; but especially the well known polyfluorinated carboxylic acid emulsifying agents, such as perfluorooctanoic acid, and their alkali metal and ammonium salts, and the polyfluorinated sulfonic acids such as perfluoroalkyl sulfonic acids and their alkali metal and ammonium salts.

The suspending and emulsifying agents, if used, may be employed within wide ranges of concentration, but are ordinarily employed in amounts ranging from 0.05 to 5, preferably in amounts ranging from 0.1 to about 2 percent by weight, based on the weight of the aqueous medium.

Polymerization temperatures and pressure are not critical. The copolymerization may be carried out at temperatures within the range of about $-80°$ to about 300°C., is preferably carried out at temperatures in the range of $-20°$ to about 100°C., and more preferably yet, at temperatures within the range of about $-15°$ to about 80°C. When the copolymerization is to be conducted in an aqueous medium, then, of course, the polymerization temperature may not be lower than about 0°C. In any event, copolymerization in accordance with the present invention is carried out at temperatures above those at which the liquid polymerization medium employed will solidify, and the choice of copolymerization temperature will largely be governed by the desired decomposition rate at a given temperature of the particular initiator or initiator system employed. The copolymerization may be carried out at any desired pressure, pressures from about atmospheric to 3,000 atmospheres can be used, but it is suitably conducted at pressures ranging from about atmospheric to about 500 p.s.i.g. For reasons of economy in equipment design, the copolymerization is preferably carried out at pressures below about 200 p.s.i.g. While, ordinarily, the copolymerization will be conducted under autogenous pressure as it may prevail under chosen polymerization conditions, it may also be conducted under superimposed pressures, as obtained by charging the polymerization zone with a gas, such as, e.g. nitrogen.

If desired, the molecular weight of the copolymer product may be varied or controlled by inclusion in the polymerization recipe of one or more of the well known chain transfer agents or chain transfer solvents.

Recovery of the copolymer product from the polymerization medium follows conventional procedure. When the reaction is carried out in 3,3,3-trifluoro-2-trifluoromethyl propene as liquid reaction medium, or in organic solvents as hereinabove defined, or in aqueous suspension, then the copolymer product is generally obtained as a white granular powder which can be readily separated from the reaction medium by conventional methods, such as gassing off the excess monomers and low boiling solvents, under reduced pressure and/or elevated temperature, if desired, or by filtration from the aqueous medium or higher boiling solvents. When the copolymerization is carried out in aqueous emulsion, then the copolymer product is generally obtained as a latex and may be recovered in conventional manner by first coagulating the latex, and then separating the coagulated product by filtration. Coagulation of the latex may be effected by methods well known to those skilled in the art, for example, by addition of electrolytes, by agitation, sonic vibration, and the like. In any event, the copolymer product after separation from the reaction medium is ordinarily washed with suitable solvents, as, e.g., methanol, to remove catalyst residues.

The melting points (DSC melting points) reported herein were determined by differential scanning calorimetry, using a Model DSC-1 Differential Scanning Calorimeter manufactured by Perkin-Elmer at a heating rate of 20°C./min. In substance, melting point determination by differential scanning calorimetry involves heating, at predetermined rate of temperature increase, both a sample of the material the melting point of which is to be determined, and of a reference, so that both the sample and the reference are always maintained at the same temperature. The difference in energy input required to maintain both sample and reference at the same temperature is determined and plotted against the temperature of the sample. Thermal energy change within the sample due to its melting will record as a peak on that plot which thus provides an accurate record of the melting point of the sample.

DESCRIPTION OF PREFERRED EMBODIMENTS

Preferred copolymer products of the present invention contain from about 30 to 51 mol percent of 3,3,3-trifluoro-2-trifluoromethyl propene, 40 to 49 mol percent of 1,1-difluoroethylene, and 0.1 to 30 mol percent preferably 0.5 to 15 mol percent, of perhalogenated monomer selected from the group consisting of tetrafluoroethylene, chlorotrifluoroethylene and mixtures thereof. Most preferred copolymer compositions contain about equimolar amounts of 3,3,3-trifluoro-2-trifluoromethyl propene and 1,1-difluoroethylene.

The following examples illustrate preferred embodiments of the present invention and set forth the best mode presently contemplated for its practice.

EXAMPLE 1

Preparation of 3,3,3-trifluoro-2-trifluoromethyl propene/1,1-difluoroethylene/tetrafluoroethylene Terpolymer An aerosol pressure bottle of 500 ml. capacity equipped with magnetic stirrer was evacuated and chilled in a dry ice bath to −78°C. and 1 ml. of a solution of trichloroacetyl peroxide in 1,1,2-trichloro-2,2,1-trifluoroethane containing 0.25 gram of trichloroacetyl peroxide was injected into the bottle, followed by 250 ml. of cold deaerated 1,1,2-trichloro-2,2,1-trifluoroethane and 50 grams of distilled 3,3,3-trifluoro-2-trifluoromethyl propene and 1,1-difluoroethylene and tetrafluoroethylene in amount sufficient to obtain a feed composition within the reactor of 30 mol percent of 3,3,3-trifluoro-2-trifluoromethyl propene, 35 mol percent of 1,1-difluoroethylene and 35 mol percent of tetrafluoroethylene. The bottle was sealed, transferred to a constant temperature bath maintained at −10°C. and polymerization was permitted to proceed at this temperature with constant stirring for a period of 64 hours. At the end of that period the pressure in the bottle was released and the polymer product was obtained as a slurry in the 1,1,2-trichloro-2,2,1-trifluoroethane. The slurry was drowned in excess methanol, the polymer product was separated by filtration and was dried at 125°C. for 25 hours. There was thus obtained 38 grams of polymer product in 30 percent conversion, based on total monomer feed having approximate composition of 43 mol percent 3,3,3-trifluoro-2-trifluoromethyl propene, 45 mol percent 1,1-difluoroethylene and 12 mol percent tetrafluoroethylene, melting at 295°C. The approximate melting point of an unmodified 3,3,3-trifluoro-2-trifluoromethyl propene/1,1-difluoroethylene copolymer of about equimolar composition is about 326°C.

EXAMPLE 2

Preparation of 3,3,3-trifluoro-2-trifluoromethyl propene/1,1-difluoroethylene/chlorotrifluoroethylene Terpolymer A 3 gallon glass lined autoclave equipped with agitator was evacuated and charged with 4,500 ml. of deionized water and 450 grams of 3,3,3-trifluoro-2-trifluoromethyl propene. Autoclave and contents were adjusted to temperature of 20°C. and agitation was started at 500 rpm. A gaseous monomer mixture of 85 mol percent of 1,1-difluoroethylene and 15 mol percent of chlorotrifluoroethylene was charged into the autoclave to total pressure of 165 p.s.i.a. to obtain approximate liquid phase monomer composition of 65 mol percent 3,3,3-trifluoro-2-trifluoromethyl propene, 30 mol percent of 1,1-difluoroethylene and 5 mol percent of chlorotrifluoroethylene. The autoclave was then charged with 22.5 ml. of an initiator solution of 0.0072 grams per ml. of trichloroacetyl peroxide in 1,1,2-trichloro-2,2,1-trifluoroethane. Autoclave pressure was kept constant by continuous addition of monomer blend containing 85 mol percent of 1,1-difluoroethylene and 15 mol percent of chlorotrifluoroethylene. Initiator addition was continued in 20 minute intervals by adding 7.4 ml. portions of the above initiator solution, thereby maintaining initiator concentration within the reaction mixture at $4 \times 10^{-3}$ mol percent, based on initial charge of 3,3,3-trifluoro-2-trifluoromethyl propene. Polymerization was thus continued for 12 hours after which time autoclave contents were discharged and the polymer product was collected by filtration. It was washed with hot water and dried at 100°C. overnight. Yield of polymer product was 555 grams, corresponding to 88 percent conversion based on feed of 3,3,3-trifluoro-2-trifluoromethyl propene. The melting point of the polymer product was 322°C., as compared to 329° for unmodified 3,3,3-trifluoro-2-trifluoromethyl propene/1,1-difluoroethylene copolymer of similar proportions. It had a melt index of 1.2 grams per 10 minutes at 345°C. under 2,160 grams load. The extrudate from the melt indexer was smooth and tough, as compared to a rougher more brittle extrudate for the corresponding unmodified 3,3,3-trifluoro-2-trifluoromethyl propene/1,1-difluoroethylene copolymer.

Similar results are obtained when in the above Examples a mixture of chlorotrifluoroethylene and tetrafluoroethylene is substituted for the tetrafluoroethylene (Example 1) or chlorotrifluoroethylene (Example 2).

I have surprisingly found that incorporation of tetrafluoroethylene, chlorotrifluoroethylene or mixtures thereof in any proportion into 3,3,3-trifluoro-2-trifluoromethyl propene/1,1-difluoroethylene copolymer effectively reduces the melting point of the corresponding 3,3,3-trifluoro-2-trifluoromethyl propene/1,1-difluoroethylene copolymer to any desired level below that of the copolymer, yet maintains melt indices comparable to those of the corresponding copolymers. Melting point depression results in a corresponding improvement in melt processability, as above demonstrated. Incorporation of chlorotrifluoroethylene, tetrafluoroethylene or mixtures thereof does not adversely affect the oxidative stability, friction properties or chemical resistance, as compared to the unmodified 3,3,3-trifluoro-2-trifluoromethyl propene/1,1-difluoroethylene copolymer.

These results are surprising in view of the fact that other halogenated comonomers, or ethylene do not give these desired results. For example, my experiments have shown that hexafluoropropene and hexafluoroacetone, both of which have been used a comonomers for modifying properties of fluorine-containing polymer compositions are unsuitable for present purposes since they are virtually excluded from the polymerization reaction even at high feed concentrations. For example, at 70 mol percent feed concentration hexafluoropropene depressed the melting point of the resulting copolymer containing 3,3,3-trifluoro-2-trifluoromethyl propene/1,1-difluoroethylene in about equimolar proportions by only about 5°C. No melting point depression was noted when hexafluoroacetone was included in the monomer feed composition at a level of 20 mol percent. Further, I found that hexafluoropropene acts as a strong chain terminator, as evidenced by much lower melt index value of 3,3,3-trifluoro-2-trifluoromethyl propene/1,1-difluoroethylene copolymer made under similar conditions but in the absence of hexafluoropropene.

Attempts to introduce ethylene as a third monomer showed a drastic influence on the type of polymer formed. At low levels, say 0.5 to 5 mol percent in the feed, the product obtained was substantially unmodified 3,3,3-trifluoro-2-trifluoromethyl propene/1,1-difluoroethylene copolymer. When ethylene was incorporated into the feed at a level of about 20 mol percent, the product obtained was essentially a 3,3,3-trifluoro-2-trifluoromethyl propene/ethylene copolymer. At intermediate levels of ethylene addition of 10 and 12 mol percent the melting point of the terpolymer product could not be determined due to decomposition before melting.

Incorporation of ethylvinyl ether even at concentrations as low as 0.5 mol percent yielded amorphous modified copolymer having very low melting points. Thus, from a feed composition of 49.75 mol percent 3,3,3-trifluoro-2-trifluoromethyl propene, 49.75 mol percent of 1,1-difluoroethylene and 0.5 mol percent of ethylvinyl ether there was obtained amorphous terpolymer product having melting point of 35°C.

The copolymer compositions of the present invention have combined all the advantageous mechanical properties of the unmodified corresponding 3,3,3-trifluoro-2-trifluoromethyl propene/1,1-difluoroethylene copolymers described in U.S. Pat. No. 3,706,723, but in addition thereto have improved melt processing properties. They are useful for the same purposes as described for the unmodified copolymer in U.S. Pat. No. 3,706,723.

Since various changes and modifications may be made in the invention without departing from the spirit and essential characteristics thereof, it is intended that all matter contained in the above description shall be interpreted as illustrative only; the invention being limited only by the scope of the appended claims.

I claim:

1. A solid copolymer of 3,3,3-trifluoro-2-trifluoromethyl propene, 1,1-difluoroethylene and perhalogenated comonomer selected from the group consisting of tetrafluoroethylene, chlorotrifluoroethylene and mixtures thereof, containing from about 5 to 52 mol percent of 3,3,3-trifluoro-2-trifluoromethyl propene, from about 30 to 90 mol percent of 1,1-difluoroethylene and from about 0.1 to 30 mol percent of perhalogenated comonomer.

2. Copolymer according to claim 1 containing from about 0.5 to 15 mol percent of perhalogenated comonomer.

3. Copolymer according to claim 1 containing from about 30 to 51 mol percent of 3,3,3-trifluoro-2-trifluoromethyl propene and 40 to 49 mol percent of 1,1-difluoroethylene.

4. Copolymer according to claim 3 containing from about 0.5 to 15 mol percent of perhalogenated comonomer.

5. Copolymer according to claim 1 containing 3,3,3-trifluoro-2-trifluoromethyl propene and 1,1-difluoroethylene in about equimolar proportions.

6. Copolymer according to claim 5 wherein the perhalogenated comonomer is tetrafluoroethylene.

7. Copolymer according to claim 5 wherein the perhalogenated comonomer is chlorotrifluoroethylene.

8. Copolymer according to claim 5 containing from about 0.5 to 15 mol percent perhalogenated monomer.

9. Copolymer according to claim 8 wherein the perhalogenated comonomer is tetrafluoroethylene.

10. Copolymer according to claim 8 wherein the perhalogenated comonomer is chlorotrifluoroethylene.

* * * * *